(12) United States Patent
Malchow et al.

(10) Patent No.: US 12,543,953 B2
(45) Date of Patent: Feb. 10, 2026

(54) VISUALIZATION FOR FLUORESCENT GUIDED IMAGING

(71) Applicant: Sensors Unlimited, Inc., Princeton, NJ (US)

(72) Inventors: Douglas Stewart Malchow, Lawrence, NJ (US); John Liobe, New York, NY (US); Thuc-Uyen Nguyen, Princeton, NJ (US); Brendan Mc Granaghan Murphy, Lawrence, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 502 days.

(21) Appl. No.: 17/471,991

(22) Filed: Sep. 10, 2021

(65) Prior Publication Data

US 2022/0079447 A1 Mar. 17, 2022

Related U.S. Application Data

(60) Provisional application No. 63/078,629, filed on Sep. 15, 2020.

(51) Int. Cl.
*A61B 5/00* (2006.01)
*G06T 7/73* (2017.01)

(52) U.S. Cl.
CPC .............. *A61B 5/0071* (2013.01); *G06T 7/73* (2017.01); *A61B 2562/0233* (2013.01); *A61B 2576/00* (2013.01); *G06T 2207/10064* (2013.01)

(58) Field of Classification Search
CPC ........ A61B 2562/0233; A61B 2576/00; A61B 5/0071; G06T 2207/10064; G06T 7/07
See application file for complete search history.

(56) References Cited

U.S. PATENT DOCUMENTS

| | | | |
|---|---|---|---|
| 7,794,394 B2 | 9/2010 | Frangioni | |
| 2006/0004292 A1* | 1/2006 | Beylin | A61B 5/0071 600/476 |
| 2011/0267444 A1* | 11/2011 | Yamaguchi | A61B 1/00009 348/E7.085 |
| 2016/0110870 A1* | 4/2016 | Moriyama | G01N 21/6486 382/128 |
| 2017/0207262 A1* | 7/2017 | Lin | H10F 39/18 |

(Continued)

OTHER PUBLICATIONS

Rogalski, "Progress in focal plane array technologies", 2012 (Year: 2012).*

(Continued)

*Primary Examiner* — Brooke Lyn Klein

(57) ABSTRACT

A method of medical imaging is provided. The method includes receiving pulsed light emissions from fluoroscopic material in a target field of a patient, wherein the target field was treated with fluoroscopic material that emitted the pulsed light emissions in response to a pulsed laser signal. The pulsed laser signal has a wavelength that was selected to excite the fluoroscopic material. The method further includes capturing a passive image of the target field and asynchronously detecting pulses of the pulsed light emissions. The method further includes determining pulse-source coordinates in the image, wherein the pulse-source coordinates correspond to a location of the fluoroscopic material that emitted the pulsed light emissions.

20 Claims, 8 Drawing Sheets

(56) References Cited

U.S. PATENT DOCUMENTS

2019/0328318 A1* 10/2019 Wood .................. A61B 5/0064
2020/0397241 A1* 12/2020 Talbert ............... A61B 1/00194

OTHER PUBLICATIONS

Fluorescence imaging; retrieved from: https://en.wikipedia.org/wiki/Fluorescence_imaging; Aug. 23, 2021.

De Lille, A. "Optical Molecular Imaging/Surgical Guidance: 'Painting' tumors to guide cancer surgery"; May 1, 2014; retrieved from: https://www.bioopticsworld.com/bioimaging/article/16429630/optical-molecular-imagingsurgical-guidance-painting-tumors-to-guide-cancer-surgery.

Carr, J.A., et al.; "Shortwave infrared fluorescence imaging with the clinically approved near-infrared dye indocyanine green"; Department of Chemistry, Massachusetts Institute of Technology, Cambridge, MA 02139; Edwin L. Steele Labs for Tumor Biology, Department of Radiation Oncology, Massachusetts General Hospital, MGH Research Institute and Harvard Medical School, Boston, MA 02114; and Department of Chemical and Biological Engineering, Tufts University, Medford, MA 02155. Contributed by Moungi G. Bawendi, Mar. 7, 2018 (sent for review Nov. 2, 2017; reviewed by Frauke Alves and Ute Resch-Genger); PNAS, Apr. 24, 2018, vol. 115, No. 17, 4465-4470.

Zhao, J., et al., NIR-I-to-NIR-II fluorescent nanomaterials for biomedical imaging and cancer therapy, J. Mater. Chem. B, 2018,6, 349-365; retrieved from: https://pubsssc.oreenicontent/articlelanding/2018/tbic7tb02573d; Aug. 23, 2021.

Fluorescence image-guided surgery; retrieved from: https://en.wikipedia.org/wiki/Fluorescence_image-guided_surgery; Aug. 23, 2021.

Image-guided surgery; retrieved from: https://en.wikipedia.org/wiki/Image-guided_surgery; Aug. 23, 2021.

* cited by examiner

VISUALIZATION FOR FLUORESCENT GUIDED IMAGING

BACKGROUND OF THE DISCLOSURE

1. Field of the Invention

The present disclosure relates to a fluorescent-guided imaging, and more particularly application of asynchronous pulse detection to fluorescent-guided imaging.

2. Description of Related Art

Currently, in the operating room, FDA approved fluorescent dyes are used to 'tag' or 'label' tissue cells that can then be seen visually by the surgeon or by silicon detector based cameras. These tags emit or glow at unique 'colors' or wavelengths when 'excited' by illumination at higher energy wavelengths (i.e., having shorter wavelengths). The fluorescent molecules are engineered to attach to specific tissues by binding their unique biological molecules, for example, to particular to sequences of DNA or RNA, anti-bodies, tissue proteins, cell coatings, or calcium ion states indicative of nerve signals.

In one application of fluorescent guided imaging, cancer surgery can include administration of antibodies to patients, wherein the antibodies bind to antigens that would be present at the location of cancer cells. Additionally, one or more fluorescent dyes that are engineered to attach to the antibodies are administered to the patient, thus tagging cancer cells. The fluorescent dyes can then be excited by energy having a wavelength that was selected to cause the fluorescent dyes to admit light. During fluorescent image guided surgery, a cancerous tumor mass that has accumulated many of the tags can emit a glow that can be visible to the surgeon. Nerves and/or other key structures can be tagged with different fluorescents that, when excited, glow at other wavelengths so that this tissue that can be visually distinguished from the tumor. The glowing of the tumor and/or of healthy tissue can provide vision enhancement to the surgeon. This can help the surgeon to find the tumor more quickly and can enhance surgical precision.

However, these enhancements can be limited. For example, the tumor may be disposed underneath a flap of tissue. The light emitted by the fluorescent dye may be scattered or attenuated by this tissue and the tumor may be obscured from view during the surgery. Researchers have been exploring fluorescent dyes that emit light having longer wavelengths than visible light. This is advantageous since photons emitted at longer wavelengths tend to be less scattered by tissue, enabling the emitted light to travel further through layers of tissue and still be detected.

Many groups have been investigating fluorescent dyes or other materials that emit in the near infrared (NIR) and short-wave infrared (SWIR) ranges and would transmit more efficiently through tissue with less scattering or attenuation. Such novel tags, such as, emitters that are based on quantum dots, engineered nano-tubes or rare-earth materials need extensive testing for use in humans before regulatory approvals can be obtained. A discovery that indocyanine green (ICG) dye, which has already been approved as safe in humans, can emit an appreciable glow in the SWIR range has encouraged further research.

While conventional methods and systems have generally been considered satisfactory for their intended purpose, there is still a need in the art for techniques that improve visual and quantitative information provided to a surgeon using fluorescent guided imaging, such as for improving information about tagged cells in the surgical field even when obscured by overlying tissue.

SUMMARY OF THE INVENTION

In accordance with an aspect of the disclosure, a method of medical imaging is provided. The method includes receiving pulsed light emissions from fluoroscopic material in a target field of a patient, wherein the target field was treated with fluoroscopic material that emitted the pulsed light emissions in response to a pulsed laser signal. The pulsed laser signal has a wavelength that was selected to excite the fluoroscopic material. The method further includes capturing a passive image of the target field and asynchronously detecting pulses of the pulsed light emissions. The method further includes determining pulse-source coordinates in the image, wherein the pulse-source coordinates correspond to a location of the fluoroscopic material that emitted the pulsed light emissions.

In one or more embodiments, the method can further include outputting the passive image and an indicator at the pulse-source coordinates for display.

In one or more embodiments, the fluoroscopic material can include first and second fluoroscopic materials that respectively emit light responsive to light having first and second wavelengths, the pulsed laser signal can include a first pulsed laser signal and a second pulsed laser signal, the first and second pulsed laser signals can have the respective first and second wavelengths, and pulses of the first and second pulsed laser signals can be modulated with first and second modulation schemes. Additionally, the method can further include identifying first pulses of the detected pulses as being emitted responsive to the first pulsed laser signal based on modulation of the first pulses corresponding to the first modulation scheme and identifying first pulses of the detected pulses as being emitted responsive to the first pulsed laser signal based on modulation of the first pulses corresponding to the first modulation scheme. The first and second pulse-source coordinates in the passive image are determined, wherein the first pulse-source coordinates correspond to a first location of the target area treated with the first fluoroscopic material that emitted the first pulses, and the second pulse-source coordinates correspond to a second location of the target area treated with the second fluoroscopic material that emitted the second pulses.

In one or more embodiments, the method can further include outputting the passive image and first and second indicators, wherein the first indicator is output to be displayed at the first pulse-source coordinates and the second indicator is output to be displayed graphically different from the first indicator at the second pulse-source coordinates.

In one or more embodiments, the method can further include emitting the first and second pulsed laser signals and modulating pulses of the first and second pulsed laser signals with the respective first and second modulation schemes.

In one or more embodiments, the method can further include generating a time-of-flight (TOF) signal indicative of TOF from receipt of the pulsed light emissions relative to a reference time, and determining a distance associated with the location of the fluoroscopic material relative to a location at which the pulsed light emissions are received, wherein the distance is determined as a function of the TOF signal and the pulse-source coordinates are determined as a function of the distance.

In one or more embodiments, the passive image is displayed in three-dimensions. The method can further include generating a TOF signal indicative of time of receipt of the pulsed light emissions relative to a reference time and determining a distance associated with the location of the fluoroscopic material relative to a location at which the pulsed light emissions are received. The distance is determined as a function of the TOF signal and the pulse-source coordinates are determined and displayed in three-dimensions as a function of the distance.

In accordance with further aspects of the disclosure, a medical imaging system includes a focal plane array and an image processor. The focal plane array is configured to receive pulsed light emissions from fluoroscopic material in a target field of a patient, wherein the target field was treated with fluoroscopic material that emitted the pulsed light emissions in response to a pulsed laser signal, the pulsed laser signal having a wavelength selected to excite the fluoroscopic material. The focal plane array is further configured to capture a passive image of the target field and asynchronously detect pulses of the pulsed light emissions. The image processor is configured to determine pulse-source coordinates in the image, wherein the pulse-source coordinates correspond to a location of the fluoroscopic material that emitted the pulsed light emissions.

In one or more embodiments, the image processor can be further configured to output the passive image and an indicator at the pulse-source coordinates for display.

In one or more embodiments, the fluoroscopic material can include first and second fluoroscopic materials that respectively emit light responsive to light having first and second wavelengths. The pulsed laser signal can include a first pulsed laser signal and a second pulsed laser signal, wherein the first and second pulsed laser signals have the respective first and second wavelengths, and pulses of the first and second pulsed laser signals are modulated with first and second modulation schemes.

The image processor can be further configured to identify first pulses of the detected pulses as being emitted responsive to the first pulsed laser signal based on modulation of the first pulses corresponding to the first modulation scheme and identify second pulses of the detected pulses as being emitted responsive to the second pulsed laser signal based on modulation of the second pulses corresponding to the second modulation scheme. The image processor can further be configured to determine first and second pulse-source coordinates in the image, wherein the first pulse-source coordinates correspond to a first location of the target area treated with the first fluoroscopic material that emitted the first pulses and the second pulse-source coordinates correspond to a second location of the target area treated with the second fluoroscopic material that emitted the second pulses.

The image processor can further be configured to output the passive image and first and second indicators, wherein the first indicator is output to be displayed at the first pulse-source coordinates and the second indicator output to be displayed graphically different from the first indicator at the second pulse-source coordinates.

In one or more embodiments, the medical imaging system further includes a pulsed light source configured to emit the first and second pulsed laser signals and modulate pulses of the first and second pulsed laser signals with the respective first and second modulation schemes.

In one or more embodiments, the medical imaging system further includes a pulsed light source configured to emit the pulsed laser signal.

In one or more embodiments, the focal plane array can be further configured to generate a TOF signal indicative of time of receipt of the pulsed light emissions relative to a reference time, and the image processor can determine a distance associated with the location of the fluoroscopic material relative to a location at which the pulsed light emissions are received. The distance can be determined as a function of the TOF signal and the pulse-source coordinates can be determined as a function of the distance.

In one or more embodiments, the passive image can be displayed in three-dimensions. The focal plane array can be further configured to generate a TOF signal indicative of time of receipt of the pulsed light emissions relative to a reference time, and the image processor can be further configured to determine, as a function of the TOF signal, a distance associated with the location of the fluoroscopic material relative to a location at which the pulsed light emissions are received. The pulse-source coordinates can be determined as a function of the distance and are determined and displayed in three-dimensions as a function of the distance. In one or more embodiments, the focal plane array can include an array of pixels, and each pixel can be configured to capture a passive image and asynchronously detect the pulses of the pulsed light emissions.

In one or more embodiments, the method can further include the focal plane array (FPA) can include an array of pixels, wherein each pixel can include a component, which upon asynchronously sensing a pulse of the pulsed light emissions, outputs a pulse sensed signal. The FPA can include a laser range finding circuit that uses the pulse sensed signal to generate the TOF signal.

In accordance with further aspects of the disclosure, a medical imaging processing system is provided. The medical imaging processing system includes a memory configured to store a plurality of programmable instructions and a processing device in communication with the memory. The processing device, upon execution of the plurality of programmable instructions, is caused to determine pulse-source coordinates in an image, wherein the pulse-source coordinates correspond to a location of a fluoroscopic material that emitted pulsed light emissions. The target field was treated with the fluoroscopic material, wherein the fluoroscopic material responded to a pulsed laser signal by emitting the pulsed light emission. The pulsed laser signal had a wavelength that was selected to excite the fluoroscopic material. The passive image of the target field was captured and the pulses of the pulsed light emissions were asynchronously detected. The processing device, upon execution of the plurality of programmable instructions, is further caused to output the passive image and an indicator at the pulse-source coordinates for display.

In one or more embodiments, the fluoroscopic material can include first and second fluoroscopic materials that emit light responsive to light having respective first and second wavelengths, the pulsed laser signal can include a first pulsed laser signal and a second pulsed laser signal, the first and second pulsed laser signals can have the respective first and second wavelengths, and pulses of the first and second pulsed laser signals can be modulated with first and second modulation schemes. The processing device, upon execution of the plurality of programmable instructions, can be further caused to identify first pulses of the detected pulses as being emitted responsive to the first pulsed laser signal based on modulation of the first pulses corresponding to the first modulation scheme and identify second pulses of the detected pulses as being emitted responsive to the second pulsed laser signal based on modulation of the second pulses corresponding to the second modulation scheme. The processing device, upon execution of the plurality of programmable instructions, can be further caused to determine first and second pulse-source coordinates in the image, wherein the first pulse-source coordinates correspond to a first location of the target area treated with the first fluoroscopic material that emitted the first pulses and the second pulse-source coordinates correspond to a second location of the target area treated with the second fluoroscopic material that emitted the second pulses. The processing device, upon execution of the plurality of programmable instructions, can be further caused to output for display the passive image and first and second indicators, wherein the first indicator is output to be displayed at the first pulse-source coordinates and the second indicator is output to be displayed graphically different from the first indicator at the second pulse-source coordinates.

In one or more embodiments, the passive image can be displayed in three-dimensions, and the processing device, upon execution of the plurality of programmable instructions, can be further caused to receive a distance associated with the location of the fluoroscopic material relative to a location at which the pulsed light emissions are received, wherein the distance is determined as a function of a received TOF signal indicative of time of detection of the pulses of the pulsed light emissions relative to a reference in time. The pulse-source coordinates can be 3D coordinates determined as a function of the distance, wherein the indicator can be output to be displayed in three-dimensions.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
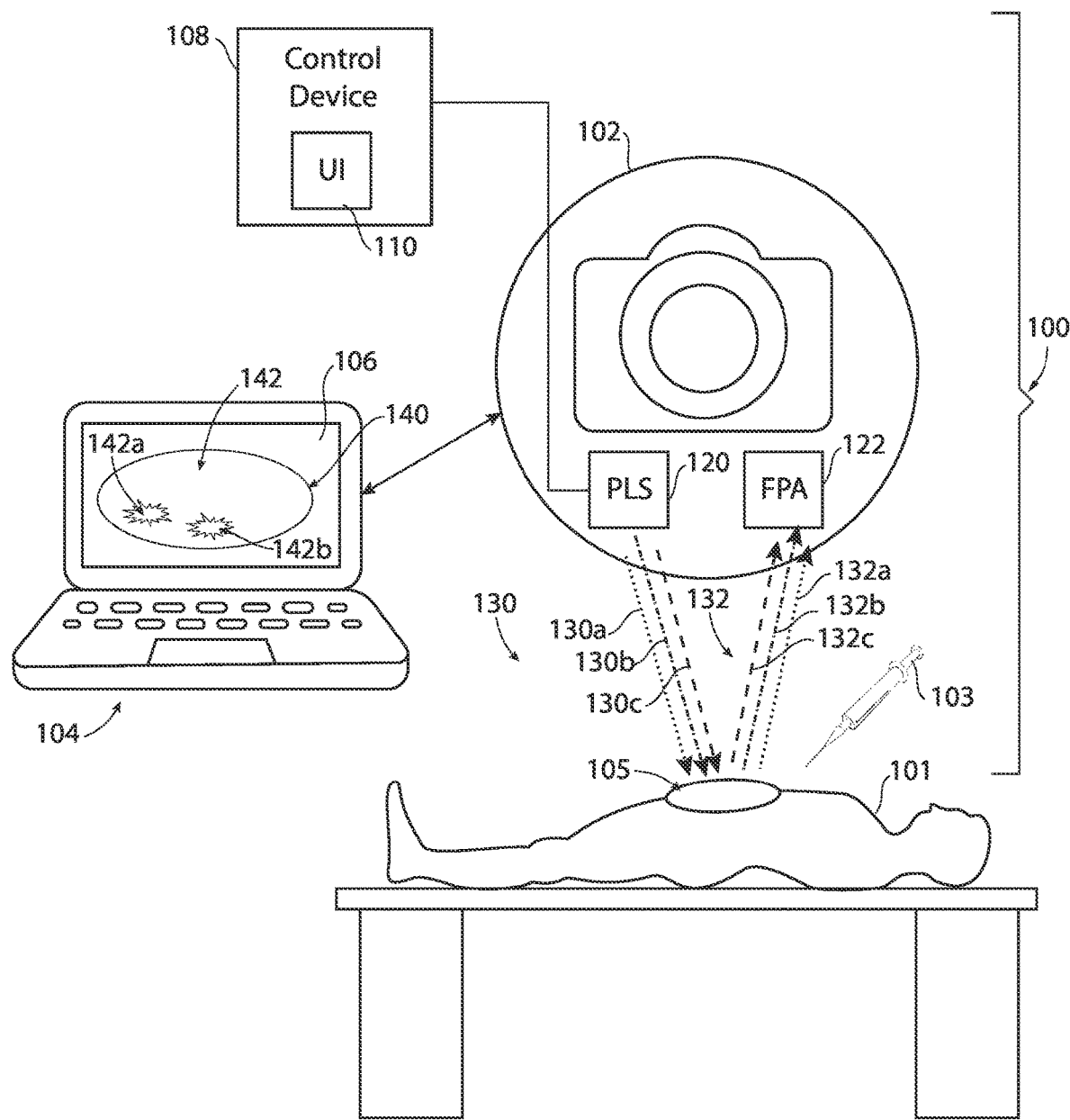
FIG. 1 shows a schematic diagram of an example medical imaging system, in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of an example medical imaging system in accordance with the disclosure is shown in FIG. 1 and is designated generally by reference character 100. Other embodiments of a medical imaging system in accordance with the disclosure, or aspects thereof, are provided in FIGS. 2-8, as will be described.

Medical imaging system 100 includes a medical imaging device 102, an image processor 104, and a display device 106. The medical imaging system 100 is used for imaging a patient 101 at a target field 105 by a process called fluoroscopic guided imaging. The patient can be from the human or animal species.

Fluoroscopic guided imaging is a process in which a patient is administered one or more fluoroscopic materials 103 that have been approved by regulatory office as being safe for human application. Each fluoroscopic material 103 includes a fluorescent dye that is used to tag a particular type of tissue cell so that the tagged tissue cells become visible, e.g., to a surgeon or an imaging device. Each fluoroscopic material 103 emits a light having a unique wavelength in response to being excited by a light having a wavelength that is included within a particular range of wavelengths. Each fluoroscopic material 103 has molecules that are engineered to attach to a specific type of tissue by binding to molecules of the tissue's cells, thus tagging the tissue's cells. Examples of tissue (meaning biological) molecules to which the molecules of the fluoroscopic materials 103 can bind include particular sequences of DNA or RNA, antibodies, tissue proteins, cell coatings, and calcium ion states indicative of nerve signals.

In an example fluoroscopic guided imaging procedure, once a fluoroscopic material 103 is administered to a target field of a patient, a laser having a wavelength selected to excite the fluoroscopic materials 103 is applied to the target field. The term "laser" is an acronym for "light amplification by stimulated emission of radiation" and can refer to different wavelengths of light.

A cancerous tumor mass in the target field can be tagged by accumulating many molecules of the fluoroscopic materials 103. This accumulation of the fluoroscopic materials 103 causes the tumor mass to glow at a color that corresponds to the wavelength of the light emitted by the fluoroscopic materials 103 in response to the excitation. The glow can be visible to a surgeon during a medical procedure, either to the naked eye or to a camera that can display an indication of the glow.

The medical imaging device 102 includes pulsed light source (PLS) 120 and a focal plane array (122). The PLS 120 includes at least one laser source, wherein each laser source is configured to emit a pulsed laser signal 130 at a selected wavelength. The wavelength is selected to be in a range for exciting a particular one of the fluoroscopic material(s) 103 that was administered. In response to the pulsed laser signal 130 emitted by the PLS 120, the fluoroscopic material 103 that was administered to the target field is excited by the pulsed laser signal 130 and emits an pulsed light emissions 132.

The FPA 122 is configured to acquire passive images of the target field 105 as well as to asynchronously detect the pulsed light emissions 132 and determine pulse-source coordinates in the image, the pulse-source coordinates corresponding to a location of the fluoroscopic material that emitted the pulsed light emissions 132. Acquisition of a passive image can use ambient light, whereas the asynchronous detection of pulses is responsive to pulsed emissions.

In one or more embodiments, FPA 122 includes a single array of pixels, wherein each pixel can acquire the passive image and can also asynchronously detect the pulsed light emissions 132. The acquisition of the passive image and the process for detection of the pulsed light emissions 132 can occur simultaneously.

In one or more embodiments, FPA 122 includes a first array of circuits for capturing the passive image and a second array of circuits for asynchronous detection of the pulsed light emissions 132. The first and second arrays can operate simultaneously or sequentially for simultaneous or sequential capturing of the passive image and asynchronous detection of the pulsed light emissions 132.

The captured passive image can be displayed by the display device 106 as a displayed passive image 140 with indicators 142 at the pulse-source coordinates. The indicator 142 can either pulse or be steady, depending on the desired display style. Even if the indicator 142 is based on a pulsed signal, the indicator 142 can be displayed in a sustained manner.

The medical imaging device 102, image processor 104, and/or display device 106 can be provided in a single integrated device, such as a mobile or stationary computer, including a tablet or a smart phone. Furthermore, the medical imaging device 102, image processor 104, and/or display device 106 can share one or more components or each be separate devices. The PLS 120 can be integrated with the medical imaging device 102, can be a separate, stand-alone device, or can be integrated with the image processor 104 and/or display device 106. A control device 108 can control the PLS 120, such as for controlling when to deliver pulsed light and selecting which wavelength to use. A user can operate the control device 108 via a user interface (UI) 110. The control device 108 can be integrated with the PLS 120, image processor 104, and/or display device 106, or can be a separate, stand-alone device.

Fluoroscopic guided imaging can be used for numerous applications, such as for diagnosing cancer, tumor resection, targeted photothermal therapy, and targeted drug delivery. For example, cancer surgeons can use antibodies to tag cancer cells or other tissues with the fluoroscopic material 103. However, it can be a challenge for a medical imaging device to selectively detect and display tagged cells in a field of interest, such as a surgical field, when the tagged cells are obscured by overlying tissue. Further challenges are due to the need to quickly locate a tumor during surgery, while avoiding damage to key tissue types, such as nerves, or blood vessels.

To address these challenges, FPA 122 includes pixels that are very sensitive to changes in intensity and can detect weak pulse modulation in each pixel while also capturing a passive image of the field of view of the FPA 122. This sensitivity to change can improve detection relative to detection possible by the naked eye or a traditional camera of weak or obscured emissions, and can further allow the location of the source of the pulsed excited light to be displayed in a captured passive image with information about frequencies or patterns of pulses of the pulsed light emissions 132. FPA 122 can be configured to detect pulsed excited light in various wavelengths, including short-wave infrared (SWIR), visible SWIR (Vis-SWIR), near infrared (NIR), mid-wave infrared (MWIR), long-wave infrared (LWIR), ultraviolet, etc., without constraints to a particular wavelength. The SWIR and Vis-SWIR wavelengths can be particular beneficial for detecting tagged tissue that is obscured by overlaying tissue and for use with fluoroscopic materials that have received regulatory approval for use with humans.

FPA 122 outputs a captured passive image to the image processor 104 with X-Y positions of pixels of the FPA 122 that have detected pulses or a pulse pattern of the pulsed light emissions. Image processor 104 can cause display device 106 to display the passive image 140 with graphical indicators 142 of locations in the passive image that correspond to the X-Y positions, calling attention of a medical practitioner (e.g., a surgeon) to these locations. The indicators can blink, aiding visibility of the indicators 142.

In one or more embodiments, the tissue can be treated with multiple fluoroscopic materials (e.g., first, second, and third fluoroscopic materials 103, without limitation to a particular number of fluoroscopic materials 103) that each respond to a different wavelength of applied pulsed laser signals 130 by emitting pulsed light emissions 132. The PLS 120 can administer multiple pulsed laser signals 130a-130c (without limitation to a particular number of signals), each having a different wavelength. Additionally, the pulses of the pulsed laser signals 130a-130c can each be modulated with a different modulation scheme (e.g., first, second and third modulation schemes). In response, the fluoroscopic materials 103 can emit pulsed light emissions 132a-132c, respectively. Pulsed light emission 132a is modulated by first modulation schemes, and similarly, the pulsed light emissions 132b and 132c are modulated, respectively, by the second and third modulation schemes.

Control device 108 can control administration of the pulsed laser signals 130, the wavelengths of the respective pulsed laser signals 130, and modulation of pulses of the respective pulsed laser signals 130. For example, pulsed laser signals 130a-130c can be administered sequentially or simultaneously, or a combination thereof. A user can use UI 110 to enter user selections to control device 108 for controlling administration, wavelength, and modulation of pulses of the pulsed laser signals 130.

FPA 122 can detect pulses of each of pulsed light emissions 132a-132c and output pulse detection information to image processor 104. The pulse detection information can include the time of detection, wavelength of each pulse detected, and coordinates of pixels of FPA 122 that detected the pulses. FPA 122 further provides a captured passive image to image processor 104. Image processor 104 can distinguish pulses of each pulsed light emissions 132a-132c based on the wavelength of the pulses and detect a modulation scheme of the pulses per pulsed light emissions 132a-132c. Based on the modulation scheme detected, image processor 104 can further identify which of pulsed laser signals 130a-130c excited emission of each of pulsed light emissions 132a-132c. In this way, simultaneous or closely spaced pulsed light emissions 132a-132c can be differentiated from one another.

Image processor 104 can determine the pulse-source coordinates in each of the pulsed light emissions 132a-132c and cause a different indicator 142a-142c, respectively, to be displayed at of first and second pulse-source coordinates in the displayed passive image 140. Each indicator 142a-142c can graphically indicate the pulsed laser signal 130a-130c that excited the pulsed light emission 132a-132c to which the respective indicator 142a-142c corresponds.

Accordingly, different fluoroscopic materials 103 can be selected, wherein each fluoroscopic materials 103 responds to a pulsed laser signal 130 having a different wavelength. Each fluoroscopic material 103 can be engineered to bind to a different type of tissue. For example, a first fluoroscopic material 103 can be engineered to bind to a cancerous tumor and a second fluoroscopic material 103 can be engineered to bind to nerve tissue. When displayed by display device 106, the indicators 142a-c can represent a different type of tissue and indicate the coordinates in the displayed passive image 140 of that type of tissue. A surgeon can be aided by knowing the location of nerve tissue to avoid when resectioning the cancerous tissue.

Due to the sensitivity of FPA 122 to sense pulses and detect pulsed light emissions 132 that were emitted from a location that is potentially overlapped by other tissue, medical imaging system 100 can display the location of multiple types of tissue, even when one or more of the types of tissue are being overlapped by a different tissue.

Medical imaging system 100 can potentially reduce ambiguity associated with surgery or other medical treatments by differentiating between different types of tissue and indicating the location of each type in a displayed image, even when one or more of the types of tissue is obscured by overlaying tissue. The displayed passive image can be annotated with the types and locations of the different types of tissue by using different graphical indicators, such as icons, colors, flashing, highlighting, etc.

Figure 2:
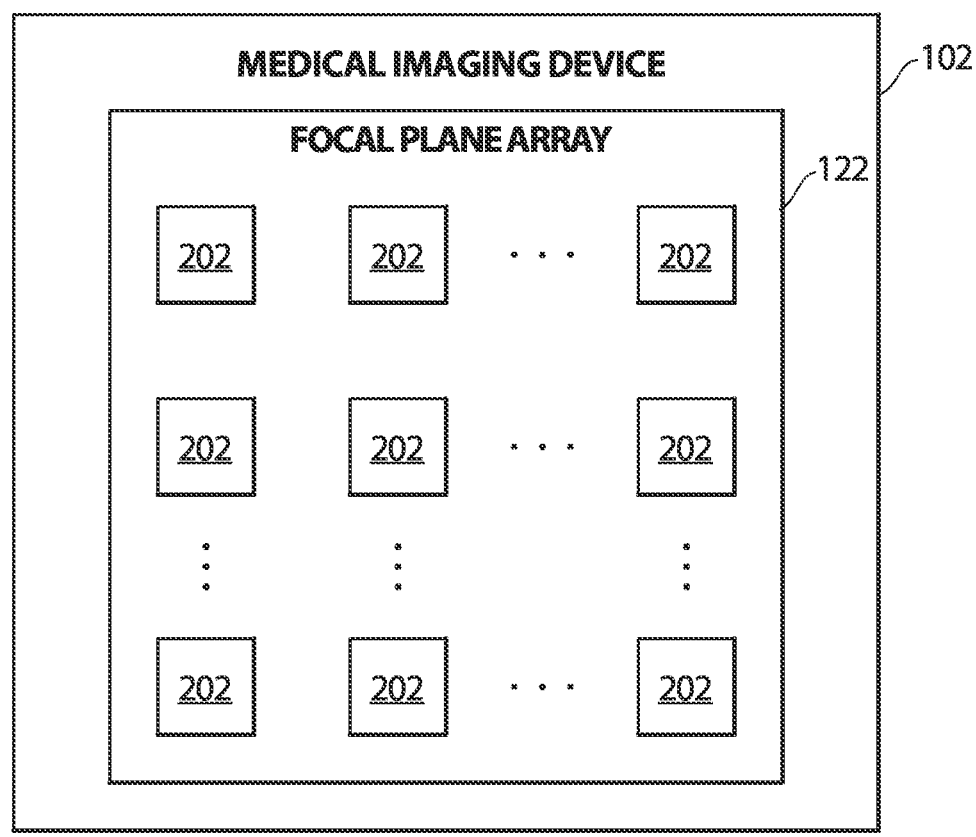
FIG. 2 shows an example focal plane array (FPA) of pixels of a medical imaging system, in accordance with embodiments of the present disclosure.

FIG. 2 shows an example FPA 122 of an example medical imaging device 102 having an array of multimode pixels 202. Each multimode pixel 202 can operate in multiple modes, including passive and active sensing of light. In the passive imaging mode, multimode pixel 202 can sense reflected ambient light. The reflected light can be sensed and integrated and readout synchronously at regular intervals, such as in frames. In the active imaging mode, multimode pixel 202 can asynchronously sense a pulse, such as from a pulse emitted by a fluoroscopic material that was excited by a laser pulse.

Figure 3:
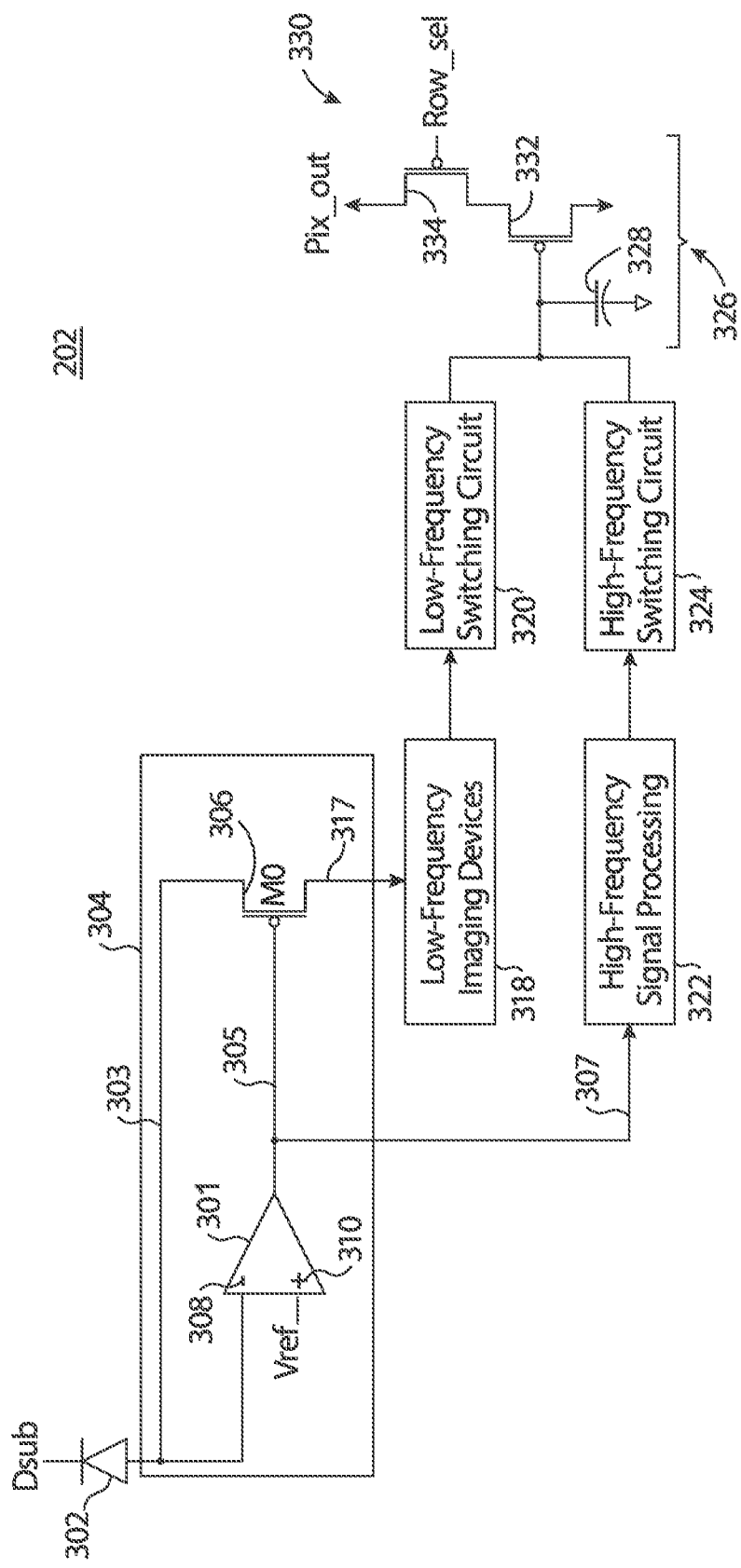
FIG. 3 shows a first embodiment of an example pixel of an example pixel having mixed mode capabilities, the example pixel being included in an FPA of medical imaging system, in accordance with embodiments of the present disclosure.

FIG. 3 shows an example multimode pixel 202 of FPA 122. Furthermore, examples of multimode pixels are described in U.S. Pat. Nos. 9,769,400; 9,871,066; 10,222,258; and 10,520,589, all of which are assigned to Sensors Unlimited Inc., and all of which are incorporated herein by reference in their entirety.

An example multimode pixel 202 is shown in FIG. 3. The multimode pixel 202 includes a photodetector 302 that transmits charge signals in response to a detected excitation signal, such as photons from a source of IR radiation light or a laser. The photodetector 302 converts the excitation signal into electrical charge signals. The charge signals can include a high-frequency laser pulse signals and a low-frequency image or background signals.

The multimode pixel 202 further includes one or more circuit components, which can include a detector biasing circuit 304, low-frequency imaging devices 318 (having an an adaptive low-pass filter, buffer, and capacitor, high-frequency signal processing circuits 322 (having an adaptive high-pass filter, comparator, and capacitor and optionally having a gain stage), switching circuits 320 and 324, and readout circuit 326. Switching circuits include a low-frequency switching circuit 320 and a high-frequency switching circuit 324 that enable sharing of the readout circuit 325. For example, the low-frequency and high-frequency switching circuits 320, 324 can be controlled by a reset signal, and function together as a multiplexer that determines whether the signal from the low-frequency imaging devices 318 or the high-frequency signal processing circuit 322 is passed to the signal readout circuit 126.

In one or more embodiments, switching circuits 320 and 324 can be combined into a single switching circuit. In one or more embodiments, a separate readout circuit 326 can be provided for each of low-frequency imaging devices 318 and high-frequency signal processing circuits 322. The circuit components 304, 318, 320, 322, and 324 can be individual electronic devices, or one or more of circuit components 304, 318, 320, 322 and 324 can share one or more electronic devices.

Detector biasing circuit 304 includes an input buffer 301 and an injection device 306. Input buffer 301 buffers charge signals and outputs a signal that is transmitted along a first buffer-out signal path 305 to injection device 306 and a second buffer-out signal path 307 to high-frequency signal processing circuit 322. Injection device 306 receives a charge signal from the photodetector 302 via charge signal path 303, and controls flow of the charge signal to a low-frequency signal path 117 based on the signal output from input buffer 301 along first buffer-out signal path 305. Input buffer 301 and injection device 306 form a feedback circuit.

The detector biasing circuit 304 responds to the charge signals output by the photodetector 302 based on a frequency of the charge signals. While maintaining a DC voltage across the photodetector 302, the detector biasing circuit 304 responds to high-frequency charge components output by the photodetector 302 by causing high-frequency currents associated with the charge signals to integrate on the photodetector 302. Due to a high input impedance of both the input buffer 301 and injection device 306, high-frequency incident charge signals have instantaneous charge integration at charge signal path 303 associated with capacitance of photodetector 302 and parasitic capacitances at charge signal path 303.

Input buffer 301 can include one or more electrical devices that change impedance in response to intensity of the incident charge signal on photodetector 302. An example of such electrical devices that change impedance in response to the frequency of a received signal include a transistor with a fixed DC bias applied to its gate. Another example electrical device is a transistor having a gate controlled by the output of an operational amplifier that includes one or more transistors. The transistor can sample voltage at a node of charge signal path 303 and form a negative feedback loop. Depending on the bias preference of the photodetector 302, the transistor can be an NMOS transistor or a PMOS transistor. Impedance across the input buffer 301 can increase when the intensity associated with the charge signal is high, allowing charge signals having a low-frequency to flow through the injection device 306 to low-frequency path 317, and charge signals having a high-frequency to accumulate at a negative terminal to the detector biasing circuit 304 and follow high-frequency path 307. Effectively, the charge signals having a low-frequency are filtered from flowing along the high-frequency path 307.

By responding to the frequency output by the photodetector 302, the detector biasing circuit 304 can adaptively filter current associated with the charge output by the photodetector 302 in real-time. In particular, by increasing impedance in response to an increase in the intensity of charge signal, the detector biasing circuit 304 biases charge exiting the photodetector 302 to propagate along the high-frequency path 307 as an alternate path to traversing the low-frequency path 317.

The high-frequency signals that propagate along the high-frequency path 307 are filtered by the detector biasing circuit 304. The detector biasing circuit 304 can include, for example, a buffer, simple single-stage amplifier, or an operational amplifier. The adaptive high-pass filter 322 is tuned to pass high-frequency components of the signal, wherein a bandwidth of the frequency passed corresponds to an optimized frequency bandwidth that excludes spurious low-frequency noise while preserving high-frequency laser signals.

The impedance of the injection device 306 intrinsically changes in response to changes in the charge content of charge signals that reach the injection device 306. As the charge signal intensity increases, the impedance increases, impeding high-frequency components of the laser pulse signals from passing through the injection device 306. In an example embodiment without limitation thereto, bandwidth of the injection device 306 can be tuned, such as by varying the photocurrent incident on detector 302.

The bandwidth of the detector biasing circuit 304 can be varied by adjusting the bias current to an amplifier included in the detector biasing circuit 304 and can be optimized to include most of the energy included in the laser pulse signals while rejecting the low-frequency signals. Thus, by allowing only the tuned bandwidth of the charge signal associated with a laser pulse signal to pass, the detector biasing circuit 304 preserves charge information in the laser pulse signals, while minimizing low frequency background and electronic noise. In doing so, the detector biasing circuit 304 may remove signal components above a frequency threshold from the high-frequency signals and output a low-frequency signal component of the high-frequency signals.

The detector biasing circuit 304 in conjunction with the high-frequency signal processing circuit 322, which controls high-frequency signals to propagate along the high-frequency path 307, effectively performs band-pass filtering. Thus, the detector biasing circuit 304 in combination with the high-frequency signal processing circuit 322 provides an effective bandpass filter that filters high-frequency signal pulses and further filters a low-frequency portion of the background illumination, preserving the associated signal charge information.

In embodiments, the adaptive high-pass filter of high-frequency signal processing circuits 322 is included to provide further bandpass filtering to clean the pulse signal output by the detector biasing circuit 304 by removing undesired low-frequency components. The adaptive high-pass filter can include, for example, an electrical circuit in which a capacitor is followed by an equivalent resistor. For example, the adaptive high-pass filter can remove spurious, slowly varying background noises.

The cleaned signal that emerges from the adaptive high-pass filter includes a low-frequency portion of the desired high-frequency component that was biased by the detector biasing circuit 304 to propagate along the high-frequency path 307, which is divested of spurious, slowly varying DC background noises by the adaptive high-pass filter. A gain stage of high-frequency signal processing circuits can be a single or multiple stage amplifier that amplifies the signal output by the adaptive high-pass filter 322 to provide a signal having a shape that is conducive to being sampled as an analog voltage and read out by readout circuit 326. In examples without limitation thereto, high-frequency signal processing circuits 322, in addition to a high-pass filter, can also include a common-source amplifier, a common-gate amplifier, and a comparator followed by an amplifier, or any device(s) that can amplify signals output by the adaptive high-pass filter to levels that can be sampled or differentiated as signals having voltages distinctively below or above a threshold voltage.

In accordance with an embodiment, an example method is provided for bandpass processing signals output in an imaging pixel to obtain useful pulse information. The method includes receiving charge signals that correspond to sensed incident light and laser pulses, diverting high-frequency signals of the charge signals that are associated with the laser pulses to follow a high-frequency path, and effectively filtering low-frequency signals of the charge signals from following the high-frequency path.

In one or more embodiments, FPA 122 can output three-dimensional (3D) information that be used to display the displayed passive image 140 as a 3D image of the target field 105. Examples of devices having an FPS that can capture a 3D image include, without limitation, a light detection and ranging (LiDAR) mapping system, such as Microsoft Xbox Kinect™ (which uses TOF light mapping for 3D spatial information/imagery), relevant versions of iPad Pro™ and iPhone™ 12, and Microsoft HoloLens™. Furthermore, FPA 122 can use laser range finding to determine a difference between depth locations of sources of pulsed light emissions 132. The depth locations can be provided by the FPA 122 to the image processor 104. The image processor 104 can use this information to assign 3D coordinates in 3D passive image 140 for each indicator 142.

Figure 4:
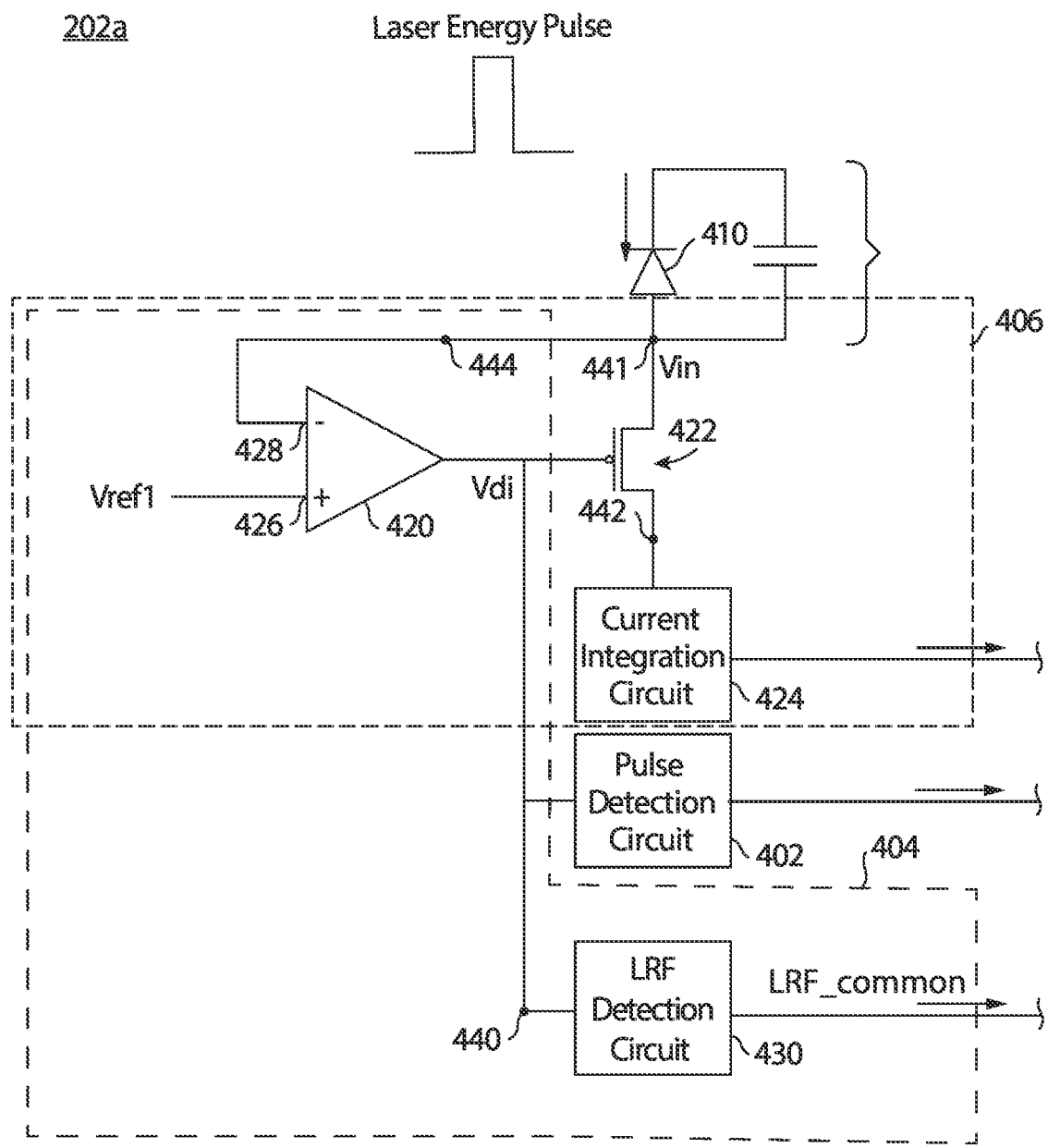
FIG. 4 shows a second embodiment of an example pixel having mixed mode and laser range finding capabilities, the example pixel being included in an FPA of medical imaging system, in accordance with embodiments of the present disclosure.

FIG. 4 shows an example multimode (MM) pixel 202a of FPA 422 having laser range finding (LRF) capabilities, also referred to as multimode LRF MM pixel 202a. Furthermore, examples of multimode LRF pixels are described in U.S. Pat. No. 10,520,589 and U.S. Publication No. 2019/0113623, both of which are assigned to Sensors Unlimited Inc., and both of which are incorporated herein by reference in their entirety.

With reference to FIG. 4, a schematic diagram of an embodiment of an example multimode pixel having LRF capabilities, referred to as multimode LRF MM pixel 202a, is shown. Multimode LRF pixel 202a is a multimode pixel that further includes an image detection circuit 406, a pulse detection circuit 402, and an LRF MM circuit 404. LRF techniques can determine a distance between LRF MM pixel 202a and a fluoroscopic medium in a target area by measuring the TOF of a pulse, such as TOF from a reference time (e.g., the time a laser source emitted its laser pulse or from a time associated with a clock signal that controls the laser source) until the pulse was detected by LRF pixel 202a, wherein the pulse was output by a fluoroscopic medium that was excited by the laser pulse.

As detections and readout speeds increase, achievable resolution will increase. Currently, technology is available, as described in U.S. patent Ser. No. 16/790,520, filed Feb. 13, 2020, which is incorporated by reference herein in its entirety, that enables achievement of a resolution of tens of millimeters, with an accuracy of several centimeters, by modifying this same pixel design to include capabilities of increasing the bandwidth of the front-end of the pixel circuitry; of including multiple thresholds for pulse detection; and of providing a voltage ramp with which timing information is extracted at each pixel location.

An LRF circuit needs high temporal resolution to detect and timestamp the reflected laser pulses with useful TOF resolution. On the contrary, passive imaging is a slower process. Output of a photodetector 410 or reflected ambient light is integrated over time to achieve a desired signal to noise ratio, which sets a practical rate at which image signals are desired to be readout. Accordingly, temporal resolution for imaging can be lower than the temporal resolution needed for laser pulse TOF determination.

In the embodiment shown in FIG. 4, output from a photodetector 410 and reflected ambient light is received and processed by an image sensing circuit 406, a pulse detection circuit 402, and LRF circuit 404. The imaging circuit 406, having a plurality of transistors, is configured to perform passive imaging operations. The plurality of transistors includes, for example, transistors included in input buffer 420, control device 422, and transistors included in a current integration circuit 424, wherein the input buffer 420 and control device 422 can form a feedback circuit.

The LRF circuit 404, including input buffer 420 and LRF detection circuit 430, is configured to perform LRF operations for detecting asynchronous reflected laser pulses. In order to detect the reflected laser pulses that are operating at high temporal frequencies, the bandwidth of the input buffer 420 can be increased, which is realized by increasing bias current of the input buffer 420. The bias current of the input buffer 420 is increased by utilizing a higher bias voltage. LRF detection circuit 430 can include one or more components to amplify signals arriving at node 440 and provide the amplified signals as to an input/output terminal of a voltage-mode sense amplifier (SA) (not shown) as output of the LRF circuit 404. The components of the LRF detection circuit 430 can include, for example and without limitation, a minimum-sized (or near minimum-sized) amplifying transistor (e.g., a PMOS or NMOS transistor), such as configured as a pull-up transistor.

A second voltage reference Vref2 can be applied to a first terminal (not shown) of source/drain terminals of the amplifying transistor of LRF detection circuit 430, and an output signal LRF_common of the multimode LRF pixel 400 is provided as an output via the other terminal of the source/drain terminals of the amplifying transistor. Configuration of which of the source/drain terminals is used for application of Vref2 and output of LRF_common depends on configuration of the amplifying transistor, such as whether the amplifying transistor is configured as a PMOS or NMOS transistor. In embodiments, one or more sense amplifiers (not shown) can receive the output of LRF circuits 404 included in an array of the FPA, such as a subarray that includes a proper subset of pixels included in the FPA.

In one or more embodiments, the LRF circuit 404 and the image sensing circuit 406 can share one or more transistors, such as transistors included in input buffer 420. In other words, at least one transistor of the second plurality of transistors, but not all of the second plurality of transistors, is included in the first plurality of transistors.

In particular, during operation, high-frequency signals follow a high-frequency path and gravitate to node 440 and low-frequency signals follow a low-frequency path and gravitate to node 442. The high-frequency signals are transmitted via LRF detection circuit 430 and output as LRF_common, which can be processed for determining a TOF between an emitted pulse signal and a sensed reflected signal. The low-frequency signals are received by the current integration circuit 424 to generate image signals that can be processed for readout and display. The image signals can be readout via an output lead that exits current integration circuit 424.

The present disclosure is not limited to a particular configuration of formation of the high-frequency and low-frequency path. By way of example, the input buffer 420, which is shown in the example embodiment as an operational amplifier, receives the charge signal output by the photodetector 410 at its input terminal 428. A reference voltage Vref1 is provided to a reference (positive) terminal 426 of the input buffer 420. The input buffer 420 isolates the photodetector 410 from a load of the LRF circuit 404 and further amplifies the signal from the photodetector 410. Initially, the impedance of the control device 422 can be high enough that almost all signal charges drift to the input terminal 428 of the input buffer 420 since the input impedance at input terminal 428 is lower than that in control device 422. These accumulated signals at the input buffer 420 tend to exit the input buffer 420 along the high-frequency path towards node 440. The signals that flow into the control device 422 can be indicated as Vin.

Low-frequency signals will be passed through control device 422, as the bandwidth of the feedback circuit is sufficient to adjust the impedance of the control device 422 in response to low-frequency signal changes.

In effect, this allows high-frequency signals, indicated as Vdi to immediately follow the high-frequency path to node 440, while the low-frequency signals are diverted through the control device 422. As a result, high-frequency signals that correspond to high-frequency laser pulses that have short durations on the order of nanoseconds (e.g., 1-10 nsec/pulse) will quickly propagate to the node 440.

As time elapses, all charge signals from the photodetector 410, including low-frequency and high-frequency signals, can pass through the control device 422 via a charge signal path that traverses node 444, entering the control device's 422 source node and exiting its drain node to the a low-frequency path to node 442 for processing by the current integration circuit 424. This allows the low-frequency imaging signals that are captured at a slower rate (e.g., 30 msec per frame) to exit the control device 422 and enter the current integration circuit 424. The input buffer 420 is an intrinsic low-pass filter. Input buffer 420 can be an amplifier that includes NMOS or PMOS transistors and has an output RC, wherein R is defined by output resistance of the input buffer 420, and C is defined by the summation of either physical or parasitic capacitances at the output node of input buffer 420.

The output of the input buffer 420 that propagates towards the gate of the control device 422 trends over time to include lower frequency signals that bias the control device 422 to pass primarily low-frequency signals from the charge that enters the control device 422 from the output of the photodetector 410, leaving high-frequency signals from the charge to accumulate at the input terminal 428 of the input buffer 420. High-frequency signal current is blocked by impedance of the control device 422 and integrates at input of the photodetector 410 to become a voltage delta at the input terminal 428 of the input buffer 420, which results in the presence of an amplified high-frequency signal at the output of the input buffer 420. The integrated charge from the high-frequency signal is conserved and will eventually pass through the control device 422 through the low-frequency path that traverses node 442, but by then it has already been low-pass filtered and its high-frequency content is lost.

The control device 422 can include a direct injection transistor that receives the charge signal from the photodetector 410. In the example embodiment shown, the direct injection transistor is a p-type MOSFET otherwise referred to as a PMOS transistor. The control device 422 receives the charge from the photodetector 410 at its source node. The charge can only flow through the control device 422 and exit from its gate node to the low-frequency signal path when the control device 422 is biased sufficiently by the output of input buffer 420 propagating toward the gate of the control device 422.

At the beginning of signal incidence, the control device 422 is kept at high input impedance, allowing time for high-frequency signals to appear at the high-frequency path towards node 440. After the high-frequency signals appear at the high-frequency path, control device 422 is accordingly biased sufficiently from the varying signal at the high-frequency path, allowing incident signals to exit to the low-frequency signal path as time elapses.

In the embodiment shown in FIG. 4, the LRF circuit 404 is disposed at node 440. In embodiments, the LRF circuit 404 can be disposed at another node, such as node 444 through which a larger quantity of signals traverse. However, the components of the LRF circuit 404 can detrimentally affect performance of current integration circuit 424. Additionally, the high-frequency signals traversing node 444 are of relatively low magnitude and more difficult to discern relative to the high-frequency signals that traverse node 440.

Positioning the LRF circuit at node 440, rather than node 444 has advantages, since node 440 receives the high-frequency signals that propagate through the high-frequency path without disrupting operation of the current integration circuit 424. Additionally, the signals traversing node 440 have been amplified by open loop gain of the input buffer 420, which is advantageous for detection of reflected laser pulses.

The pulse detection circuit 402 can include, for example, a filter and a buffer. The filter can further include an amplification device to amplify output from the buffer to provide a signal that is conducive to being readout by a readout circuit controlled by a periodic frame-timing signal.

The filter can be high-pass filter or a bandpass filter that is tuned to pass high-frequency components and attenuate noise with lower frequency content from this signal, thus increasing the signal-to-noise ratio and the sensitivity of the pulse detection circuit 402 to high-frequency inputs to the multimode LRF pixel MM 202*a*. Since an input buffer 420 functions as an intrinsic low-pass filter, when the filter of the pulse detection circuit 302 is embodied as a high-pass filter, the combination of the input buffer 420 and the pulse detection circuit 402 filter form a bandpass filter. The pulse detection circuit filter can be, for example, an RC filter having a capacitor (not shown) and a resistor (not shown). The output of the pulse detection circuit's buffer (or amplification device, if included) can be controlled by a switch circuit for controlled provision to a synchronous readout circuit. The amplification device can be, for example, an operational amplifier formed of transistors.

In embodiments, the LRF circuit 404 can operate concurrently with both the image detection circuit 406 and the pulse detection circuit 402 or with either one of the image detection circuit 406 and the pulse detection circuit 402. If pixel area is limited, one can also forego having three separate readout channels, and reuse the pulse detection circuit 402 as the LRF circuit. The additional latency of having the high-frequency signal propagate through the pulse detection circuit 402 would need to be calibrated and removed from the TOF measurement.

In embodiments, the image detection circuit 406 and the pulse detection circuit 402 can share one or more electrical devices (e.g., an amplifier, buffer, transistor, resistor, and/or capacitor). In other embodiments, the image sensing circuit 406 and pulse detection circuit 402 are independent of one another and do not share any electrical devices.

The first and second paths can both be synchronous relative to their respective image and pulse frame timing signals, wherein the image and pulse frame timing signals may be asynchronous relative to each other. While the pulse detection circuit 402 detects laser pulses that are asynchronous relative to the image frame timing signals, the readout output from the pulse detection circuit 402 can be synchronized with the pulse frame timing signals.

The third path provides both asynchronous LRF processing and transmission, and does not use image or pulse frame-timing signal for readout. Activity along the third path is initiated by detection of a pulse event in the pixel. Once a pulse event is detected, there is no timing signal to initiate data readout activity. Rather, an asynchronous LRF_common signal that indicates when a pulse event has been detected is transmitted from the pixel.

Outside of the pixel, the LRF_common signal is processed in an asynchronous manner, without use of a timing signal, by a first portion of a TOF receiver circuit. The first portion of the TOF receiver circuit can, for example, compare the residual signal at node 440 to a threshold signal or combine, e.g., at a common net, the LRF_common signal output by the pixel with LRF_common signals output by other pixels of the pixel array, such as for comparison to a threshold signal and/or applying an OR function (e.g., using one or more comparators, OR circuits (or the equivalent), sense amplifier(s) or the like. Thus, the first portion of the TOF receiver circuit can verify detection of a pulse event by any of the pixels in the array.

In a second portion of the TOF receiver circuit, the time at which detection of the pulse event by the first portion can be recorded, e.g., by a counter latch, and compared to a reference time to determine the relative time difference between original emission of a laser pulse by the laser source and verified detection of the reflected laser pulse.

Figure 5:
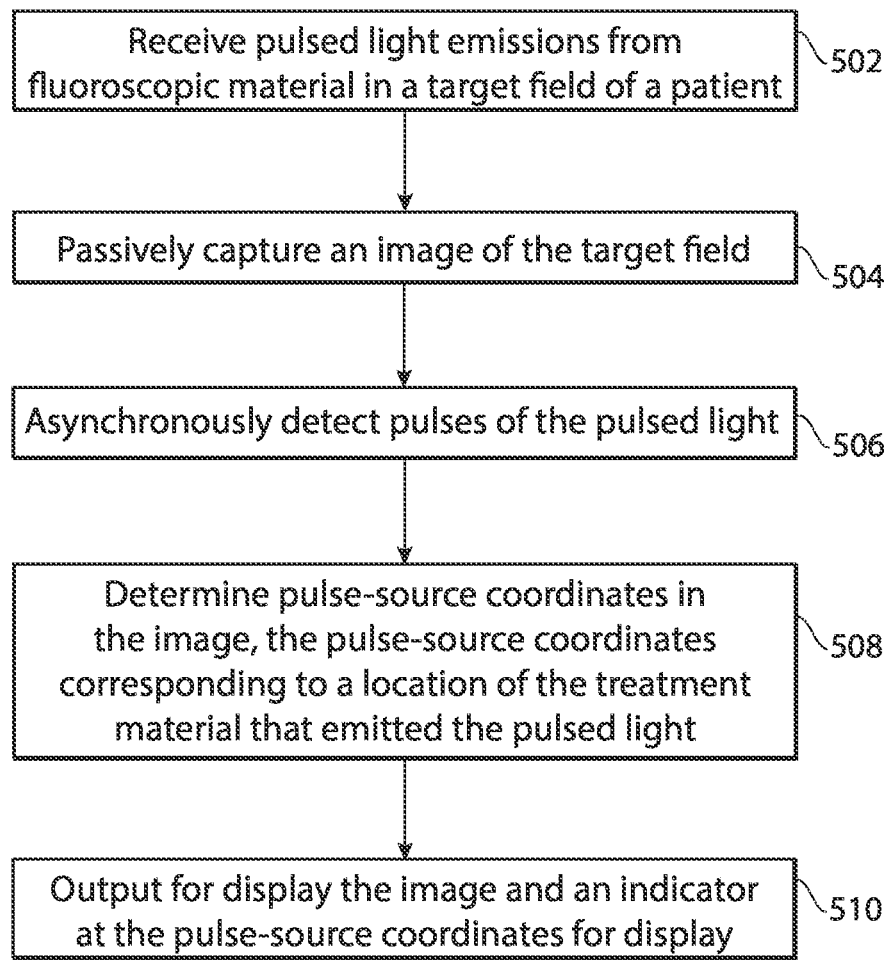
FIGS. 5-7 show flowcharts of respective example methods performed by a medical imaging system, in accordance with embodiments of the present disclosure.
Figure 6:
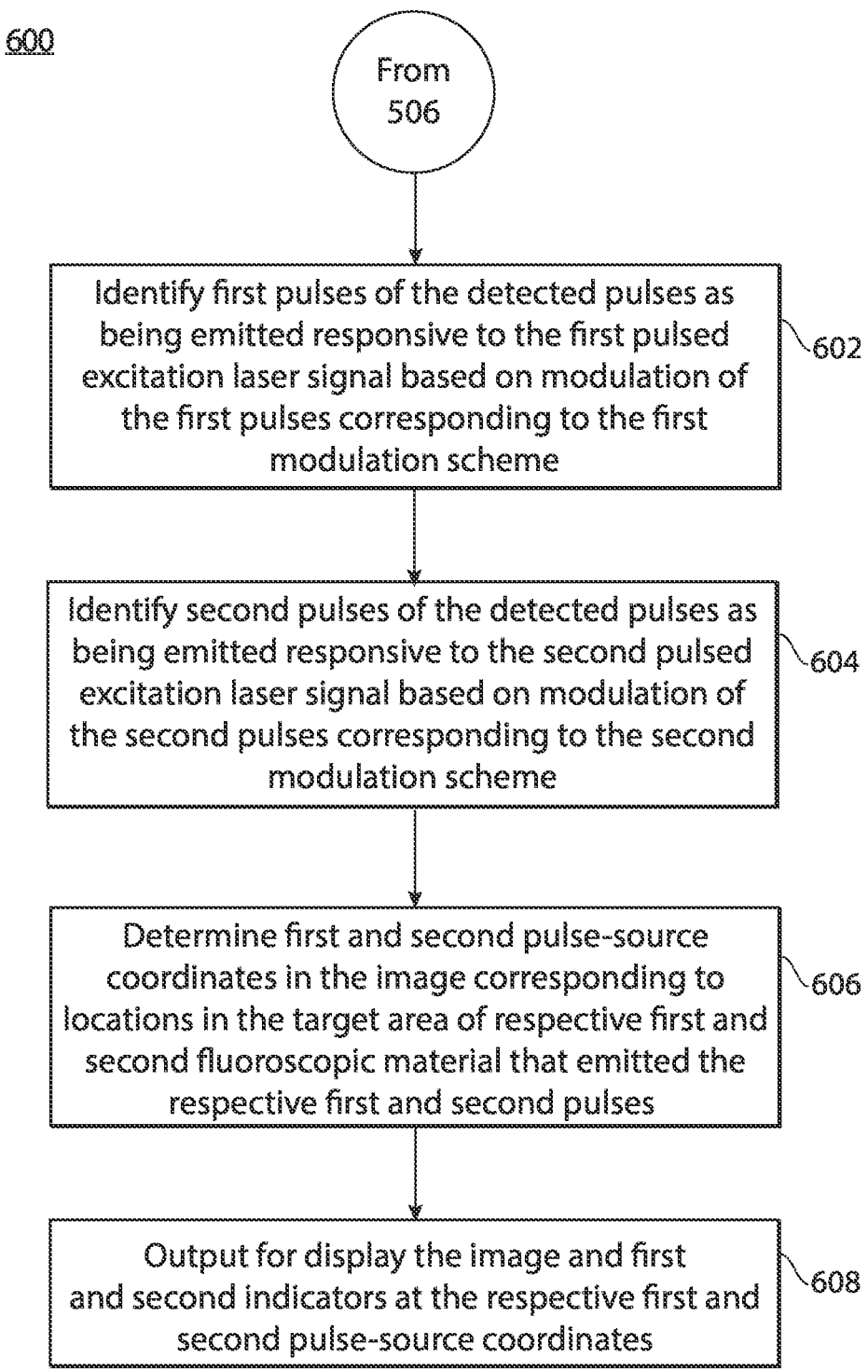
Figure 7:
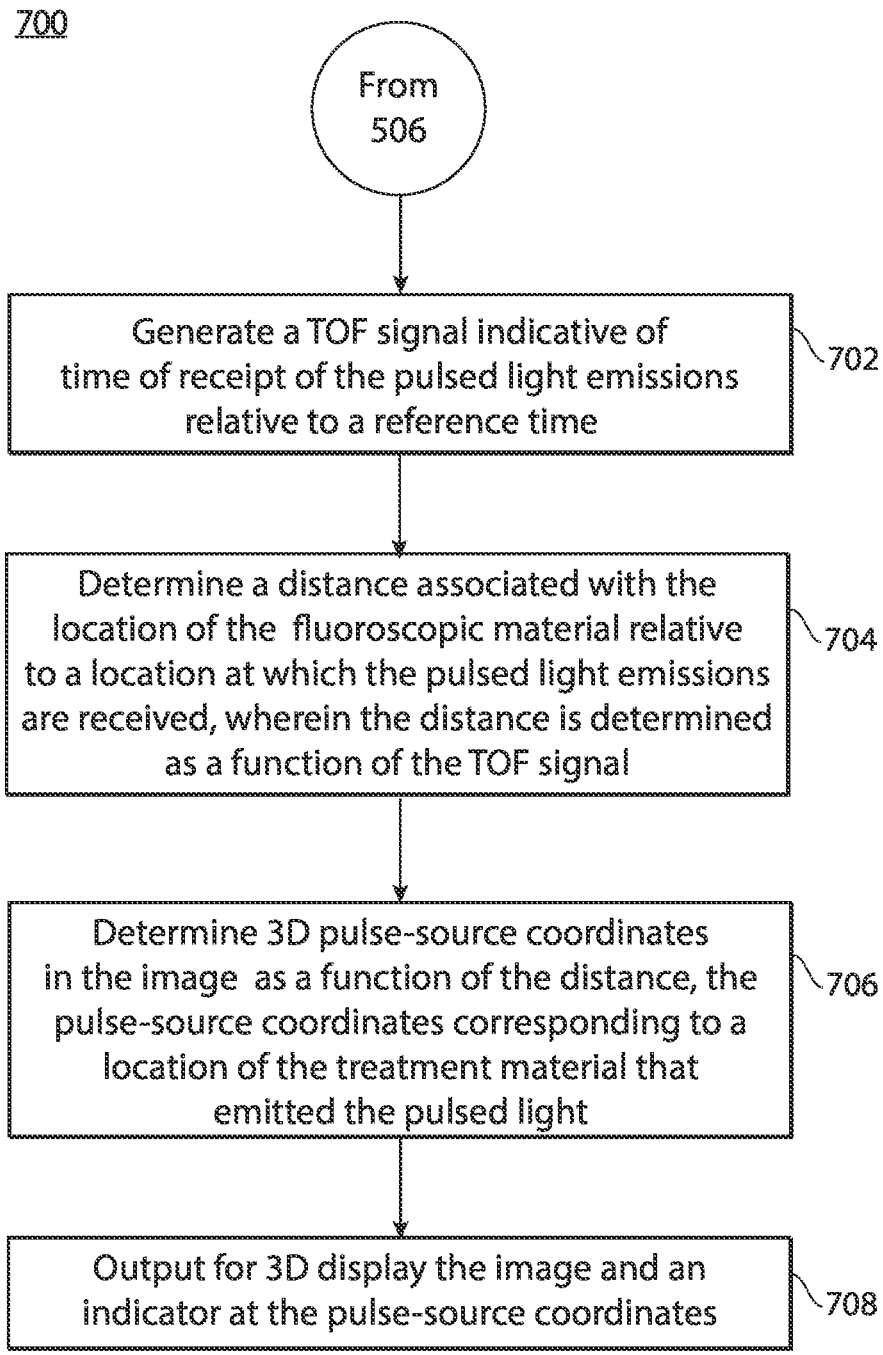

With reference now to FIGS. 5-7, shown are flowcharts demonstrating implementation of various exemplary methods performed by a medical imaging system. It is noted that the order of blocks shown in FIGS. 5-7 is not required, so in principle, certain of the various blocks may be performed out of the illustrated order or in parallel. Also, certain blocks may be skipped, different blocks may be added or substituted, or selected blocks or groups of clocks may be performed in a separate application following the embodiments described herein.

With reference to FIG. 5, a flowchart 500 is shown of a method performed by a FPA and an image processor of a medical imaging system, such as FPA 122 and image processor 104 of FIG. 1.

At block 502, the FPA receives pulsed light emissions from fluoroscopic material in a target field of a patient. At block 504, the FPA captures a passive image of the target field. At block 506, the FPA asynchronously detects pulses of the pulsed light. Blocks 504 and 506 can be performed simultaneously or sequentially. At block 508, the image processor determines pulse-source coordinates in the passive image that correspond to a location of the treatment material that emitted the pulsed light. At block 510, the image processor outputs display information, such as to a display device (e.g., display device 106 if FIG. 1), for displaying the passive image with an indicator at the pulse-source coordinates.

With reference to FIG. 6, a flowchart 600 is shown of a method performed by the image processor of flowchart 500 flowing block 506. At block 602, image processor identifies first pulses of the detected pulses as being emitted responsive to the first pulsed laser signal based on modulation of the first pulses corresponding to a first modulation scheme. At block 604, the image processor identifies second pulses of the detected pulses as being emitted responsive to the second pulsed laser signal based on modulation of the second pulses corresponding to the second modulation scheme.

At block 606, the image processor determines first and second pulse-source coordinates in the passive image corresponding to locations in the target area of respective first and second fluoroscopic material that emitted the respective first and second pulses. At block 608, the image processor outputs for display the passive image and first and second indicators. The first indicator is output to be displayed at the first pulse-source coordinates and the second indicator is output to be displayed graphically different from the first indicator at the second pulse-source coordinates.

With reference to FIG. 7, a flowchart 700 is shown of a method performed by the FPA and image processor of flowchart 500 flowing block 506. In this embodiment, the pixels of FPA and the FPA itself are capable of LRF processing, for example as described with respect to FIG. 4. At block 702, the FPA a TOF signal can be generated, such as by the FPA a TOF signal indicative of time of receipt of the pulsed light emissions relative to a reference time. The reference time can be the time that the pulsed laser signal was emitted or a known reference time, such as provided by a clock.

At block 704, the image processor determines a distance associated with the location of the fluoroscopic material relative to a location at which the pulsed light emissions are received, wherein the distance is determined as a function of the TOF signal.

At block 706, the image processor determines 3D pulse-source coordinates in the passive image as a function of the distance. The pulse-source coordinates correspond to a location of the treatment material that emitted the pulsed light. At block 708, the image processor outputs for 3D display the passive image and an indicator at the pulse-source coordinates.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments processing performed by the image processor 104 may be implemented or executed by one or more computer systems. For example, processing performed by image processor 104 can be implemented using a computer system such as example computer system 800 illustrated in FIG. 8. In various embodiments, computer system 800 may be a server, a mainframe computer system, a workstation, a network computer, a desktop computer, a laptop, a tablet, a smartphone, or the like, and/or include one or more of a field-programmable gate array (FPGA), application specific integrated circuit (ASIC), microcontroller, microprocessor, or the like.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types. Computer system 800 may be practiced in distributed data processing environments where tasks are performed by remote processing devices that are linked through a communications network. In a distributed data processing environment, program modules may be located in both local and remote computer system storage media including memory storage devices.

Figure 8:
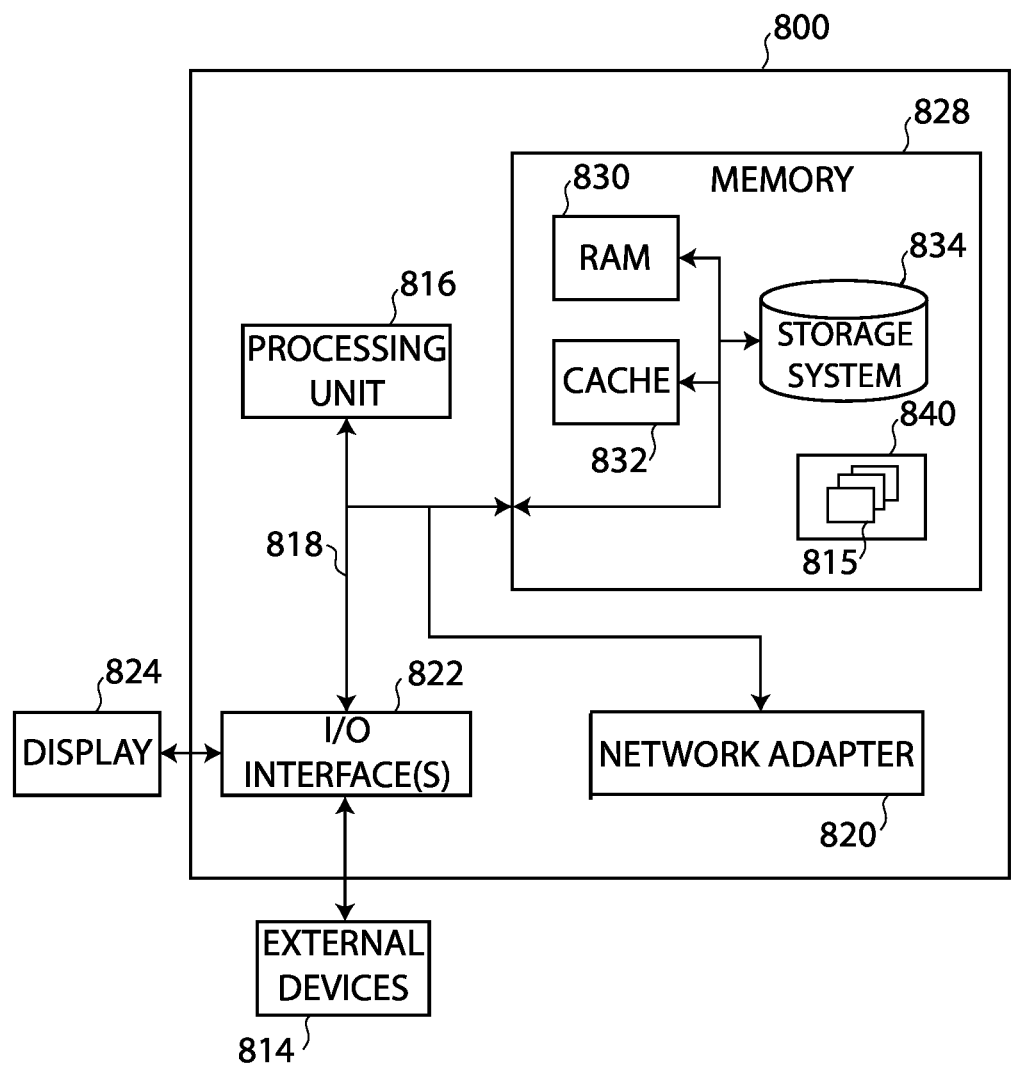
FIG. 8 is a schematic diagram of an example image processor of medical imaging system.

Computer system 800 is shown in FIG. 8 in the form of a general-purpose computing device. The components of computer system 800 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 800 typically includes a variety of computer system readable media. Such media may be any available media that is accessible by the image processor 104, and it includes both volatile and non-volatile media, removable and non-removable media.

System memory 828 can include computer system readable media in the form of volatile memory, such as random access memory (RAM) 830 and/or cache memory 832. Computer system 800 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815 may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Computer system 800 may also communicate with one or more external devices 814 such as a keyboard, a pointing device, a display 824, etc.; one or more devices that enable a user to interact with computer system 800; and/or any devices (e.g., network card, modem, etc.) that enable the image processor 104 to communicate with one or more other computing devices. Such communication can occur via Input/Output (I/O) interfaces 822. Still yet, computer system 800 can communicate with one or more networks such as a local area network (LAN), a general wide area network (WAN), and/or a public network (e.g., the Internet) via network adapter 820. As depicted, network adapter 820 communicates with the components of the image processor 104 via bus 818. It should be understood that although not shown, other hardware and/or software components could be used in conjunction with computer system 800. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A medical imaging system comprising:
    a pulsed light source configured to (i) emit a pulsed laser signal and (ii) modulate pulses of the pulsed laser signal with a modulation scheme;
    a focal plane array configured to:
        acquire passive images of a field of view at regular intervals by capturing each passive image over an image frame; and
        receive pulsed light emissions from a fluoroscopic material in the field of view while acquiring the passive images, wherein the pulsed light emissions are emitted by the fluoroscopic material in response to being excited by the pulsed laser signal, and wherein a set of respective pulsed light emissions is received during the image frame over which a respective passive image is captured; and
        change an input impedance of an input buffer in response to a frequency of a charge signal that includes low-frequency and high-frequency components generated from incidence of ambient light and the pulsed light emissions, respectively, to filter the charge signal into a low-frequency path associated with the capture of each passive image using the low-frequency components and a high-frequency path;
    at least one memory configured to store a plurality of programmable instructions; and
    at least one processing device in communication with the at least one memory, wherein the at least one processing device, upon execution of the plurality of programmable instructions, is caused, for each pixel within the image frame over which the respective passive image is captured, to:
  determine pulse-source coordinates in the respective passive image based on the set of respective pulsed light emissions, the pulse-source coordinates corresponding to locations in the field of view where the fluoroscopic material emitted the set of respective pulsed light emissions; and
  output the respective passive image and an indicator at each of the pulse-source coordinates for display.

2. The medical imaging system according to claim 1, wherein the focal plane array is further configured to asynchronously detect pulses of the pulsed light emissions.

3. The medical imaging system of claim 1, wherein:
  the focal plane array is further configured to generate a time-of-flight (TOF) signal indicative of a time of receipt of the pulsed light emissions;
  the at least one processing device, upon execution of the plurality of programmable instructions, is further caused to determine a distance associated with the location of the fluoroscopic material relative to a location at which the pulsed light emissions are received as a function of the TOF signal; and
  the pulse-source coordinates are based on the distance.

4. The medical imaging system of claim 1, wherein the focal plane array comprises an array of pixels configured to capture the passive images and asynchronously detect pulses of the pulsed light emissions.

5. The medical imaging system according to claim 1, wherein:
  the fluoroscopic material includes first and second fluoroscopic materials excitable by first and second wavelengths, respectively;
  the pulsed laser signal includes a first pulsed laser signal and a second pulsed laser signal;
  the first and second pulsed laser signals have the first and second wavelengths, respectively;
  to modulate the pulses of the pulsed laser signal with the modulation scheme, the pulsed light source is configured to modulate pulses of the first pulsed laser signal with a first modulation scheme and to modulate pulses of the second pulsed laser signal with a second modulation scheme;
  the at least one processing device, upon execution of the plurality of programmable instructions, is further caused to:
    identify first pulses of first pulsed light emissions from the first fluoroscopic material as being emitted responsive to the first pulsed laser signal based on modulation of the first pulses corresponding to the first modulation scheme; and
    identify second pulses of second pulsed light emissions from the second fluoroscopic material as being emitted responsive to the second pulsed laser signal based on modulation of the second pulses corresponding to the second modulation scheme;
  to determine the pulse-source coordinates, the at least one processing device, upon execution of the plurality of programmable instructions, is caused to determine first and second pulse-source coordinates in the respective passive image based on the identified first and second pulses, the first pulse-source coordinates corresponding to first locations in the field of view where the first fluoroscopic material emitted the first pulses and the second pulse-source coordinates corresponding to second locations in the field of view where the second fluoroscopic material emitted the second pulses; and
  to output each respective passive image and the indicator at the pulse-source coordinates for display, the at least one processing device, upon execution of the plurality of programmable instructions, is caused to output the respective passive image and X-Y positions, wherein each X-Y position indicates a focal plane array pixel that detected the pulsed light emissions.

6. The medical imaging system of claim 2, wherein:
  the passive images are displayed in three-dimensions;
  the focal plane array is further configured to generate a time-of-flight (TOF) signal indicative of a time of receipt of the pulsed light emissions;
  the at least one processing device, upon execution of the plurality of programmable instructions, is further caused to determine, as a function of the TOF signal, a distance associated with the location of the fluoroscopic material relative to a location at which the pulsed light emissions are received; and
  the pulse-source coordinates are based on the distance.

7. The medical imaging system of claim 6, wherein:
  the focal plane array comprises an array of pixels;
  each pixel includes a component that, upon asynchronously sensing a pulse of the pulsed light emissions, is configured to output a pulse sensed signal; and
  the focal plane array includes a laser range finding circuit configured to use the pulse sensed signals to generate the TOF signal.

8. The medical imaging system of claim 5, wherein:
  to emit the pulsed laser signal, the pulsed light source is configured to emit the first and second pulsed laser signals; and
  to modulate the pulses of the pulsed laser signal with the modulation scheme, the pulsed light source is configured to modulate the pulses of the first and second pulsed laser signals with the respective first and second modulation schemes.

9. The medical imaging system according to claim 5, wherein the first and second pulsed laser signals have the respective first and second wavelengths selected to excite the first and second fluoroscopic materials.

10. The medical imaging system according to claim 5, wherein the field of view includes the first and second fluoroscopic materials.

11. A method of medical imaging comprising:
  emitting a pulsed laser signal;
  modulating pulses of the pulsed laser signal with a modulation scheme;
  acquiring passive images of a field of view at regular intervals by capturing each passive image over an image frame;
  receiving, by a focal plane array, pulsed light emissions from a fluoroscopic material in the field of view while acquiring the passive images, wherein the pulsed light emissions are emitted by the fluoroscopic material in response to being excited by the pulsed laser signal, and wherein a set of respective pulsed light emissions is received during the image frame over which a respective passive image is captured;
  changing an input impedance of an input buffer in response to a frequency of a charge signal that includes low-frequency and high-frequency components generated from incidence of ambient light and the pulsed light emissions, respectively, to filter the charge signal into a low-frequency path associated with the capture of each passive image using the low-frequency components and a high-frequency path; and for each pixel within the image frame over which the respective passive image is captured:
- determining pulse-source coordinates in the respective passive image based on the set of respective pulsed light emissions, the pulse-source coordinates corresponding to locations in the field of view where the fluoroscopic material emitted the set of respective pulsed light emissions; and
- outputting the respective passive image and an indicator at each of the pulse-source coordinates for display.

12. The method of claim 11, further comprising:
asynchronously detecting, by the focal plane array, pulses of the pulsed light emissions.

13. The method of claim 11, wherein:
the fluoroscopic material includes first and second fluoroscopic materials excitable by first and second wavelengths, respectively;
the pulsed laser signal includes a first pulsed laser signal and a second pulsed laser signal;
the first and second pulsed laser signals have the first and second wavelengths, respectively;
the modulation scheme includes a first modulation scheme for pulses of the first pulsed laser signal and a second modulation scheme for pulses of the second pulsed laser signal;
the method further comprises:
- identifying first pulses of first pulsed light emissions from the first fluoroscopic material as being emitted responsive to the first pulsed laser signal based on modulation of the first pulses corresponding to the first modulation scheme; and
- identifying second pulses of second pulsed light emissions from the second fluoroscopic material as being emitted responsive to the second pulsed laser signal based on modulation of the second pulses corresponding to the second modulation scheme; and determining the pulse-source coordinates comprises determining first and second pulse-source coordinates in the respective passive image based on the identified first and second pulses, the first pulse-source coordinates corresponding to first locations in the field of view where the first fluoroscopic material emitted the first pulses and the second pulse-source coordinates corresponding to second locations in the field of view where the second fluoroscopic material emitted the second pulses.

14. The method of claim 11, further comprising:
generating a time-of-flight (TOF) signal indicative of a TOF from receipt of the pulsed light emissions relative to a reference time; and
determining a distance associated with the location of the fluoroscopic material relative to a location at which the pulsed light emissions are received, wherein the distance is determined as a function of the TOF signal, and wherein the pulse-source coordinates are determined as a function of the distance.

15. The method of claim 11, wherein:
the passive images are displayed in three-dimensions; and
the method further comprises:
- generating a time-of-flight (TOF) signal indicative of a time of receipt of the pulsed light emissions relative to a reference time; and
- determining a distance associated with the location of the fluoroscopic material relative to a location at which the pulsed light emissions are received, wherein the distance is determined as a function of the TOF signal, and wherein the pulse-source coordinates are determined and displayed in three-dimensions as a function of the distance.

16. The method of claim 11, wherein the pulsed laser signal is emitted from a pulsed light source.

17. The method of claim 13, wherein outputting each respective passive image and the indicator at the pulse-source coordinates for display comprises:
outputting the respective passive image and X-Y positions, wherein each X-Y position indicates a focal plane array pixel that detected the pulsed light emissions.

18. The method of claim 13, wherein:
emitting the pulsed laser signal comprises emitting the first and second pulsed laser signals; and
modulating the pulses of the pulsed laser signal with the modulation scheme comprises modulating the pulses of the first and second pulsed laser signals with the respective first and second modulation schemes.

19. The method of claim 13, wherein the first and second pulsed laser signals have the respective first and second wavelengths selected to excite the first and second fluoroscopic materials.

20. The method of claim 13, wherein the field of view includes the first and second fluoroscopic materials.

* * * * *